United States Patent
Aldrich et al.

(10) Patent No.: US 8,614,400 B2
(45) Date of Patent: Dec. 24, 2013

(54) DAMMING DEVICE FOR CABLE SEALING

(75) Inventors: Alvah Benjamin Aldrich, Geneva, NY (US); Susan M. Orzell, DeRuyter, NY (US)

(73) Assignee: Cooper Technologies Company, Houston, TX (US)

( * ) Notice: Subject to any disclaimer, the term of this patent is extended or adjusted under 35 U.S.C. 154(b) by 91 days.

(21) Appl. No.: 13/492,293

(22) Filed: Jun. 8, 2012

(65) Prior Publication Data

US 2012/0312593 A1 Dec. 13, 2012

Related U.S. Application Data

(60) Provisional application No. 61/495,755, filed on Jun. 10, 2011.

(51) Int. Cl.
*H01B 17/58* (2006.01)

(52) U.S. Cl.
USPC ............ 174/653; 174/652; 174/650; 439/271

(58) Field of Classification Search
USPC ........... 174/652, 653, 650; 439/271, 278, 279
See application file for complete search history.

(56) References Cited

U.S. PATENT DOCUMENTS

| | | |
|---|---|---|
| 1,929,905 A | 10/1933 | Slotsky |
| 3,254,153 A | 5/1966 | Kohler |
| 3,697,089 A | 10/1972 | Jacisin et al. |
| 3,772,637 A | 11/1973 | Paullus et al. |
| 4,267,401 A | 5/1981 | Wilkinson |
| 4,383,692 A | 5/1983 | Proctor |
| 4,424,412 A | 1/1984 | Goetter et al. |
| 5,235,138 A | 8/1993 | Shah et al. |
| 5,450,765 A | 9/1995 | Stover |
| 5,561,273 A | 10/1996 | Yamanashi |
| 5,596,176 A | 1/1997 | Everitt |
| 6,034,325 A | 3/2000 | Nattel et al. |
| 6,107,574 A | 8/2000 | Chang et al. |
| 6,354,851 B1 | 3/2002 | Bachle |
| 6,682,081 B2 | 1/2004 | Burton et al. |
| 6,716,063 B1 | 4/2004 | Bryant et al. |
| 6,802,512 B2 | 10/2004 | Muller et al. |
| 6,809,263 B2 | 10/2004 | Jackson |
| 6,957,817 B2 * | 10/2005 | Goll .............................. 277/603 |
| 7,015,394 B2 | 3/2006 | Desard et al. |

(Continued)

FOREIGN PATENT DOCUMENTS

| | | |
|---|---|---|
| JP | 2001-352653 | 12/2001 |
| JP | 2003-274545 | 9/2003 |
| KR | 20-0428581 | 10/2006 |
| KR | 10-0806705 | 3/2008 |

*Primary Examiner* — Dhirubhai R Patel
(74) *Attorney, Agent, or Firm* — King & Spalding LLP

(57) ABSTRACT

A damming device for a conductor in a cable gland connector is described herein. The damming device can include a first portion having a first thickness of a flexible elastomeric material disposed between a first diameter and a second diameter. The damming device can also include a second portion having a second thickness of the flexible elastomeric material disposed between a third diameter and the second diameter. The damming device can also include a hole having the third diameter. The first diameter is greater than the second diameter, and the second diameter is greater than the third diameter. Further, the first thickness is greater than the second thickness. The damming device can be disposed, under tension, within a slot formed between a top portion of a compound chamber and a bottom portion of a union body.

20 Claims, 10 Drawing Sheets

(56) References Cited

U.S. PATENT DOCUMENTS

| | | |
|---|---|---|
| 7,114,727 B1 | 10/2006 | Goll |
| 7,465,040 B2 * | 12/2008 | Malik et al. .................. 347/85 |
| 7,650,055 B2 | 1/2010 | Cox et al. |
| 8,050,528 B2 | 11/2011 | Shimirak et al. |
| 2011/0120766 A1 | 5/2011 | Robb et al. |
| 2011/0211792 A1 | 9/2011 | Koreeda et al. |
| 2011/0268416 A1 | 11/2011 | Shimirak et al. |
| 2011/0272894 A1 | 11/2011 | Shimirak et al. |

* cited by examiner

DAMMING DEVICE FOR CABLE SEALING

CROSS-REFERENCE TO RELATED APPLICATIONS

This application claims priority under 35 U.S.C. §119 to U.S. Provisional Patent Application Ser. No. 61/495,755, titled "Damming Mechanism for Cable Sealing" and filed on Jun. 10, 2011, the entire contents of which are hereby incorporated herein by reference.

TECHNICAL FIELD

The present disclosure relates generally to cable gland connectors and more particularly to systems, methods, and devices for a stopper or integrated damming device for sealing a cable within a cable gland assembly.

BACKGROUND

Cable gland assemblies are used for terminating cable in hazardous and nonhazardous environments. Typical cable gland assemblies provide a seal around the conductors of the cable, mechanical retention of the cable therein, electrical continuity via the termination of the cable, and an environmental seal on the outer jacket of the cable. To seal the conductors within a sealing chamber of the cable gland assembly, a sealing compound is generally used to seal the individual conductors. Generally, the sealing compound is used in conjunction with a secondary damming material to prevent the flow of the sealing compound beyond the sealing chamber. Conventional damming materials include fiber materials that require the cable gland assembly to be disassembled to place the fiber materials therein. In addition, these fiber damming materials generally require a large volume to contain the material therein. Accordingly, the use of a fiber damming material is time-consuming and cumbersome for a user to assemble. Some cable gland assemblies are available in which a rubber gland is used instead of a fiber damming material. However, these rubber glands generally have limitations in their performance.

SUMMARY

In general, in one aspect, the disclosure relates to a damming device for a conductor in a cable gland connector. The damming device can include an outer portion having a first thickness of a flexible elastomeric material disposed between a first diameter and a second diameter. The damming device can also include an inner portion having a second thickness of the flexible elastomeric material disposed between a third diameter and the second diameter. The damming device can further include a hole having the third diameter. The first diameter can be greater than the second diameter, and the second diameter can be greater than the third diameter. The first thickness greater than the second thickness.

In another aspect, the disclosure can generally relate to a damming device for a conductor in a cable gland connector. The damming device can include an outer portion having a first thickness of a flexible elastomeric material disposed between a first diameter and a second diameter. The damming device can also include an inner portion having a second thickness of the flexible elastomeric material disposed between a third diameter and a fourth diameter. The damming device can further include a hole having the fourth diameter. The first diameter can be greater than the second diameter, and the second diameter can be greater than the third diameter. In addition, the third diameter can be greater than the fourth diameter, and the first thickness is greater than the second thickness.

In yet another aspect, the disclosure can generally relate to a cable gland connector. The cable gland connector can include a union body and a hub body removably coupled to the union body. The cable gland connector can also include a compound chamber positioned within the hub body and mechanically coupled to the union body. The cable gland connector can further include a damming device disposed within a slot formed between a top portion of the compound chamber and a bottom portion of the union body. The damming device can include an outer portion having a first thickness of a flexible elastomeric material disposed between a first diameter and a second diameter. The damming device can also include an inner portion having a second thickness of the flexible elastomeric material disposed between a third diameter and the second diameter. The damming device can further include a hole having the third diameter. The first diameter can be greater than the second diameter, and the second diameter can be greater than the third diameter. Also, the first thickness can be greater than the second thickness.

These and other aspects, objects, features, and embodiments will be apparent from the following description and the appended claims.

BRIEF DESCRIPTION OF THE DRAWINGS

The drawings illustrate only exemplary embodiments and are therefore not to be considered limiting in scope, as the exemplary embodiments may admit to other equally effective embodiments. The elements and features shown in the drawings are not necessarily to scale, emphasis instead being placed upon clearly illustrating the principles of the exemplary embodiments. Additionally, certain dimensions or positionings may be exaggerated to help visually convey such principles. In the drawings, reference numerals designate like or corresponding, but not necessarily identical, elements.

DETAILED DESCRIPTION

Figure 1A:
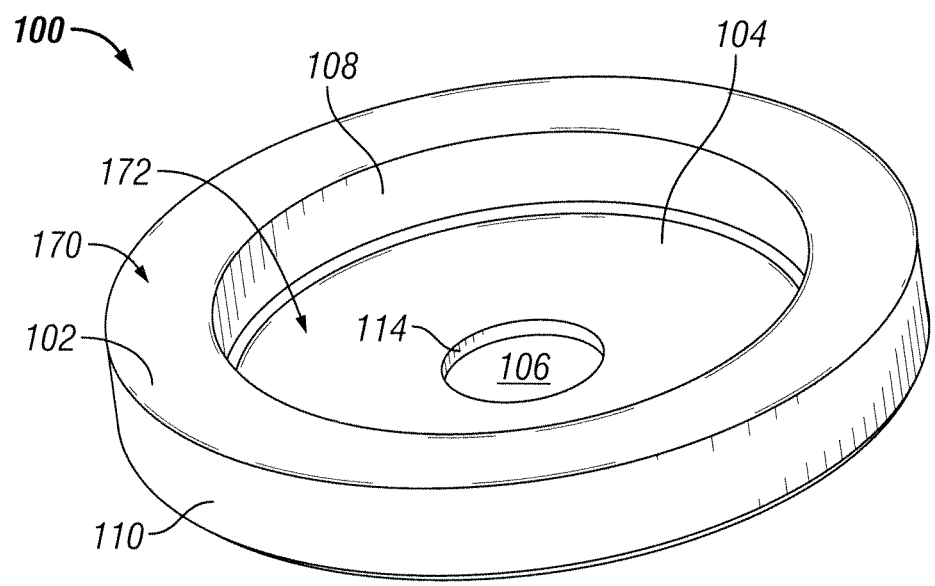
FIGS. 1A-D show various views of an exemplary damming device according to certain exemplary embodiments.
Figure 1B:
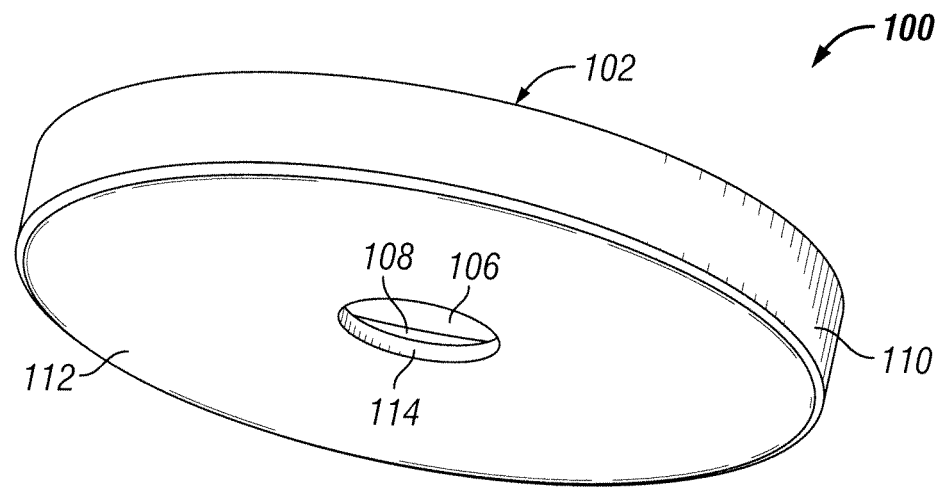
Figure 1C:
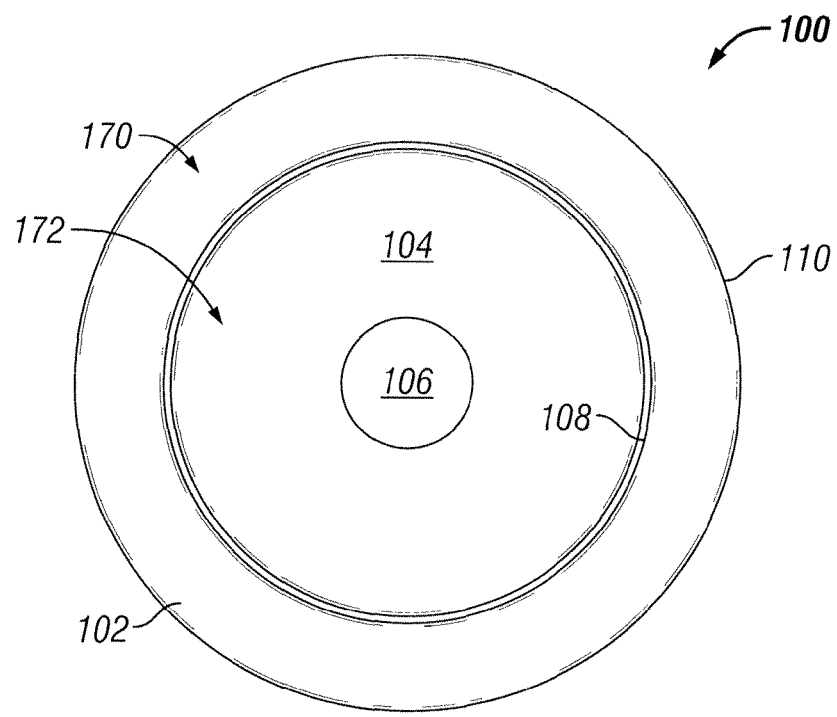
Figure 1D:
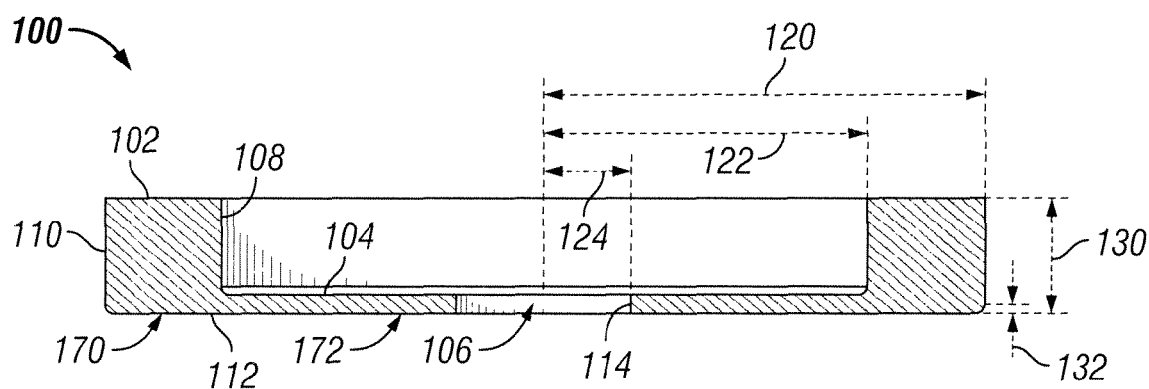

In general, exemplary embodiments provide systems, methods, and devices for an integrated damming device for sealing a cable within a cable gland assembly (also called a cable gland connector). The damming device allows one or more conductors to pass through one or more holes. Each hole provides a seal around the corresponding conductor. The seal formed by the damming device around the conductor prevents a sealing compound and/or any other liquid-based compound from passing through the hole along the conductor. The damming device does not require disassembly of the cable gland assembly to ensure proper function.

A sealing compound is any liquid-based compound that is injected into the compound chamber of the cable gland assembly. In certain exemplary embodiments, the sealing compound is injected into the compound chamber of the cable gland assembly when one or more conductors is disposed within the compound chamber of the cable gland assembly. The sealing compound can be any suitable liquid that can dry to seal the conductors within the compound chamber.

Each damming device described herein can be made of a flexible elastomeric material. Examples of such flexible elastomeric material include, but are not limited to, synthetic rubbers produced by polymerization of chloroprene, such as neoprene, polychloroprene, urethane, and silicone. In addition, or in the alternative, the flexible elastomeric material can include a butyl compound. A damming device can be made as a single piece (e.g., made from a single mold) or as multiple pieces that are mechanically coupled together. In the latter case, the multiple pieces can be mechanically coupled using one or more of a number of methods, including but not limited to epoxy, melting, fusion, a fastening device, and a clamping device. A damming device can also be called by other names, including but not limited to a damming mechanism and an armor stop.

Each hole and/or recessed area described herein is shown and described as being cylindrical or conical (i.e., circular when viewed from a horizontal cross section). Alternatively, or in addition, the holes and/or recessed areas can have one or more other shapes, viewed in two or three dimensions. For example, one or more recessed areas of a damming device may have one shape (e.g., cube), while one or more holes of the damming device can have another shape (e.g., cylinder). Examples of such shapes, when viewed in a two dimensional space, include but are not limited to a circle, an ellipse, a square, a rectangle, a hexagon, an octagon, and five-point star.

In certain exemplary embodiments, the walls of the hole and/or recessed area are conical (tapered) to channel the conductor more easily toward a designated area. When the holes, recessed areas, inner portion, outer portion, and/or any other portion of the damming device are circular, each may be defined in terms of one or more radii. Similarly, the holes, recessed areas, inner portion, outer portion, and/or any other portion of the damming device can be defined by one or more other terms appropriate for the shape of the holes, recessed areas, inner portion, outer portion, and/or any other portion of the damming device. For example, while a circular hole is described below with respect to a radius, the circular hole may also be described with respect to one or more other terms, including but not limited to a diameter, a circumference, a volume, and an area. Similarly, holes having other shapes can be described using one or more terms appropriate to that shape. The junction between a hole, a recessed area, an inner portion, an outer portion, and/or any other portion of the damming device can be formed as a pointed edge or a rounded edge.

FIGS. 1A-D show various views an exemplary damming device 100 according to certain exemplary embodiments. In one or more embodiments, one or more of the components or elements shown in FIGS. 1A-D may be omitted, repeated, and/or substituted. Accordingly, embodiments of a damming device should not be considered limited to the specific configuration shown in FIGS. 1A-D.

Referring now to FIGS. 1A-D, the damming device 100 includes an outer portion 170 defined horizontally between an outer radius 120 and an inner radius 122. The outer portion 170 also has a thickness 130 defined vertically by a height between the top surface 102 of the outer portion 170 and the bottom surface 112 of the outer portion 170. The damming device 100 also includes an inner portion 172 defined horizontally between an outer radius 122 and an inner radius 124. The inner portion 172 also has a thickness 132 defined vertically by a height between the top surface 104 of the inner portion 172 and the bottom surface 112 of the inner portion 172. In certain exemplary embodiments, as in this example, the bottom surface 112 of the outer portion 170 is the same as the bottom surface 112 of the inner portion 172. The thickness 130 of the outer portion 170 is greater than the thickness of the inner portion 172.

In certain exemplary embodiments, the outer portion 170 is made of one or more materials that are different than the materials of the inner portion 172. For example, the outer portion 170 and the inner portion 172 may be made of rubber. In addition, a metallic material can be bonded and/or co-molded with the outer portion 170 of the damming device 100 to provide additional stiffness. By having the outer portion 170 be thicker and/or stiffer than the inner portion 172, the conductor is prevented from being pushed too far into the cable gland assembly.

The inner portion 172 may have one or more holes that traverse the inner portion 172. For example, as shown in FIGS. 1A-D, the inner portion 172 may have only a single circular hole 106 positioned substantially at the horizontal center of the inner portion 172. In such a case, the hole 106 has a radius 124 (which, as described above, can also be described in other terms, such as a diameter) that is equal to the inner radius 124 of the inner portion 172. In other exemplary embodiments, as shown below with respect to FIG. 2, the inner portion 172 can have multiple holes. The wall 114 of the hole 106 can be vertical through (i.e., perpendicular to) the inner portion 172. Alternatively, as shown for example in FIGS. 4A-C below, the wall 114 can traverse the inner portion 172 at a non-normal (non-perpendicular) angle. Aside from a circular shape, each hole 106 can have one or more of a number of other shapes, including but not limited to an oval, an ellipse, a square, a rectangle, a slit, a slot, a triangle, and a free-form shape.

The transition between the outer portion 170 and the inner portion 172 can be substantially seamless, as shown in FIGS. 1A-D. Specifically, the inner wall 108 of the outer portion 170 can be substantially vertical (i.e., perpendicular to the top surface 104 of the inner portion 172). Alternatively, as shown for example in FIGS. 4A-C, an intermediate section can mechanically couple the outer portion 170 to the inner portion 172. In such a case, the intermediate section has walls that are non-normal to the top surface 102 of the outer portion 170 and/or the top surface 104 of the inner portion 172.

Figure 2:
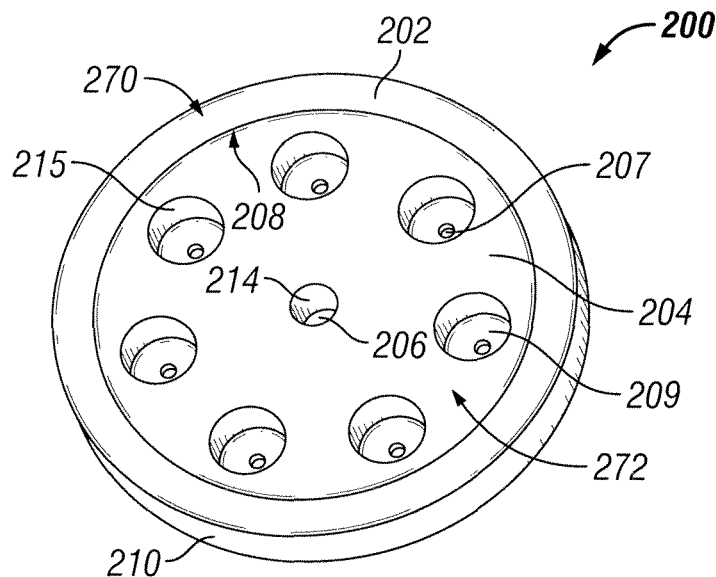
FIG. 2 shows a top perspective view of another exemplary damming device in accordance with certain exemplary embodiments.

FIG. 2 shows a top perspective view of another exemplary damming device 200 in accordance with certain exemplary embodiments. The damming device 200 of FIG. 2 is substantially the same as the damming device 100 of FIGS. 1A-D, except that the damming device 200 has multiple holes that traverse the inner portion 272. Specifically, the inner portion 272 includes a central hole 206 and a number of other holes 207 symmetrically positioned around the central hole 206. The other holes 207 can be the same size as each other or one or more different sizes. Further, the central hole 206 can be the same size and/or a different size as one or more of the other holes 207. The central hole 206 and/or the other holes 207 can also be arranged in one or more of a number of other ways, including but not limited to a grid (e.g., 2×2, 3×3), a square, a line, and randomly. When the central hole 206 and/or the other holes 207 are circular, each may be defined in terms of one or more radii.

In certain exemplary embodiments, the central hole 206 and/or the other holes 207 traverse one or more recessed portions 274 that are disposed within the inner portion 272. In FIG. 2, there are seven recessed portions 274 disposed on the inner portion 272, where each recessed portion 274 is traversed by a hole 207. Such recessed portions 274 can have the same or a different shape compared to the holes 207 that traverse the recessed portions 274. In either case, the shape of a hole 207 fits within the shape of the corresponding recessed portion 274. In certain exemplary embodiments, the hole 207 is the same size and shape as the corresponding recessed portion 274. In this example, the radius of the hole 207 is less than the radius of the opening of the recessed portion 274.

In addition to having a radius, each recessed portion 274 in FIG. 2 has a thickness. In certain exemplary embodiments, the thickness of each recessed portion 274 is less than the thickness of the inner portion 272. The thickness of the recessed portion 274 is defined between the top surface 209 of the recessed portion 274 and the bottom surface (hidden from view) of the damming device 200. In certain exemplary embodiments, one or more of the recessed portions 274 do not have a corresponding hole. In such a case, the thickness of the recessed portion 274 may be very thin to allow a conductor to easily puncture the thickness. When this occurs, the flexible nature of the material of the recessed portion 274 allows the remainder of the top surface 209 of the recessed portion 274 and the bottom surface of the damming device 200 to create a liquid-tight seal around the annulus of the conductor. In such a case, the material (e.g., the remainder of the top surface 209 of the recessed portion 274, the top surface 204 of the inner portion 272) surrounding each hole through which the conductor traverses is under tension with respect to the conductor.

Figure 3:
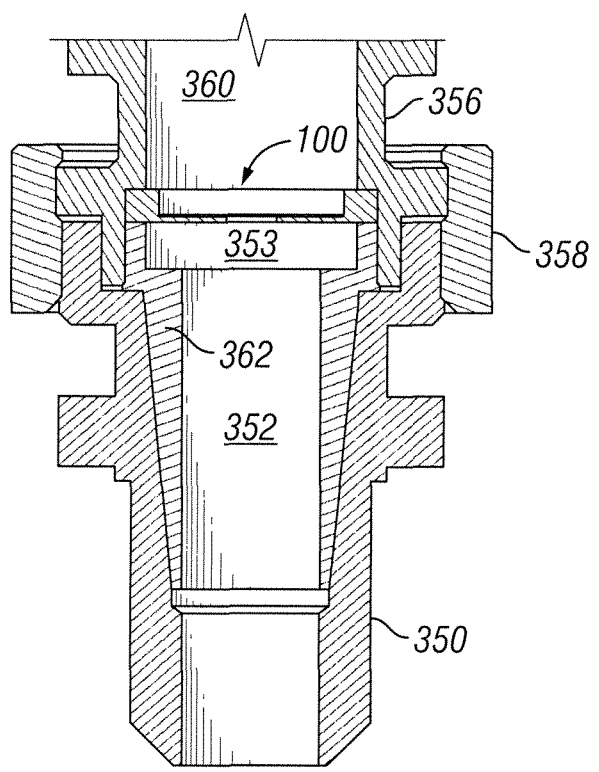
FIG. 3 shows a cross-sectional side view of a cable gland assembly using the exemplary damming device of FIGS. 1A-D in accordance with certain exemplary embodiments.

FIG. 3 shows a cross-sectional side view of a cable gland assembly 300 using the exemplary damming device 100 of FIGS. 1A-D in accordance with certain exemplary embodiments. The cable gland assembly 300 includes a hub body 350, a compound chamber 362, a union body 356, and a union body nut 358. In one or more embodiments, one or more of the components or elements shown in FIG. 3 may be omitted, repeated, and/or substituted. Accordingly, embodiments of a cable gland assembly should not be considered limited to the specific configuration shown in FIG. 3.

Referring to FIGS. 1A-D and FIG. 3, the compound chamber 362 includes a cavity 352 that traverses the length of the compound chamber 362. The cavity 352 of the compound chamber 362 receives one or more conductors that traverse the damming device 100. In certain exemplary embodiments, the cavity 352 of the compound chamber 362 also receives a sealing compound. The cavity 352 can have a substantially uniform horizontal cross-sectional area along the length of the cavity 352. Alternatively, the horizontal cross-sectional area along the length of the cavity 352 can vary. The cavity 352 is wide enough to allow one or more conductors to pass therethrough. In certain exemplary embodiments, the cavity 352 can be a hollow sleeve that is removably coupled to the inner wall of the body of the compound chamber 362.

As shown in FIG. 3, a collar 353 can be positioned at the top end of the cavity 352. The collar 353 can be an extension of the cavity 352 and have a larger horizontal cross-sectional area than the horizontal cross-sectional area of the cavity 352. The transition between the collar 353 and the cavity 352 can be abrupt (e.g., perpendicular walls, as shown in FIG. 3) or tapered. The collar 353 can be a hollow sleeve that is removably coupled to the inner wall of the body of the compound chamber 362. In such a case, the collar 353 and the cavity 352 can be the same hollow sleeve. The body of the compound chamber 362 and/or the sleeve forming the collar 353 and/or the cavity 352 can be made of one or more of a number of suitable materials. Examples of such materials include, but are not limited to, metal, plastic, rubber, ceramic, and nylon.

The body of the compound chamber 362 has a number of features having varying characteristics. For example, at the top end of the body of the compound chamber 362, is a collar that extends along the perimeter of the top end. Such a collar can have a height suitable for mating against a corresponding downward protruding feature at the bottom end of the union body 356. Further, the collar can have a width suitable for mating against a portion of the bottom surface 112 of the damming device 100. As another example, the middle and bottom end of the body of the compound chamber 362 can have a conical shape with gradually decreasing thickness moving from the top to the bottom of the compound chamber 362.

In certain exemplary embodiments, the compound chamber 362 is seated within a cavity of the hub body 350. The compound chamber 362 may be coupled to the hub body 350 in one or more of a number of ways, including but not limited to fixedly, slidably, removably, threadably, and mechanically. The hub body 350 includes a cavity that traverses the length of the hub body 350. The hub body 350 can be made of one or more of a number of suitable materials. Examples of such materials include, but are not limited to, metal, plastic, rubber, ceramic, and nylon. The hub body 350 can be made of the same or different materials used for the compound chamber 362.

The cavity of the hub body 350 can have one or more features that are complementary of the features on the outer side of the body of the compound chamber 362. For example, the cavity walls of the hub body 350 can have smooth surfaces that are disposed at angles that complement the smooth surfaces of the outer walls of the compound chamber 362. As another example, the cavity walls of the hub body 350 can have one or more features (e.g., a notch, a mating thread) that mechanically couple with complementary features disposed on the outer walls of the compound chamber 362.

In certain exemplary embodiments, when the compound chamber 362 is positioned inside of and/or coupled to the hub body 350, there is a gap that is formed around at least a portion of the perimeter of the coupled components. A bottom portion of the union body 356 is positioned inside of this gap to mechanically couple the union body 356 to the hub body 350 and the compound chamber 362. The union body 356 also includes a cavity 360 that traverses at least a portion of the union body 356 and through which one or more conductors are passed and/or positioned.

The union body 356 can be made of one or more of a number of suitable materials. Examples of such materials include, but are not limited to, metal, plastic, rubber, ceramic, and nylon. The union body 356 can be made of the same or different materials used for the compound chamber 362 and/or the hub body 350. Also, the shape (e.g., cylindrical) of the cavity 360 of the union body 356 can be the same or different than the shape of the cavity 352 and/or the collar 353 of the compound chamber 362.

When the union body 356 is mechanically coupled to the compound chamber 362 and the hub body 350, a gap is formed. The gap is sized such that the damming device 100 fits snugly within the gap. The damming device 100 can snap into place or merely fit within the gap formed by the union body 356, the compound chamber 362, and the hub body 350. In exemplary embodiments, the damming device 100 is not compressed when positioned in the gap between the union body 356, the compound chamber 362, and the hub body 350. In other words, no compressive force is applied to the damming device 100 by the union body 356, the compound chamber 362, and/or the hub body 350. In certain exemplary embodiments, the damming device 100 is held in the gap under tension and without being compressed.

The damming mechanism 100 can be positioned within the gap between the union body 356, the compound chamber 362, and the hub body 350 in one or more of a number of ways. For example, as shown in FIG. 3, the damming device 100 can be positioned in the gap with the bottom surface 112 facing down toward the compound chamber 362. As another example, the damming device 100 can be positioned in the gap with the bottom surface 112 facing up away from the compound chamber 362.

In certain exemplary embodiments, the union body nut 358 is used to mechanically couple the union body 356, the compound chamber 362, and/or the hub body 350. The union body nut 358 can be coupled to the union body 356 and/or the hub body 350 in one or more of a number of ways, including but not limited to threadably, removably, clampably, and slidably. In other words, the union body out 358 can be a nut, a clamp, a brace, or any other suitable fastening device that mechanically couples the union body 356, the compound chamber 362, and/or the hub body 350. The union body nut 358 can be made of one or more of a number of suitable materials. Examples of such materials include, but are not limited to, metal, plastic, rubber, ceramic, and nylon. The union body nut 358 can be made of the same or different materials used for the union body 356, the compound chamber 362, and/or the hub body 350.

Figure 4A:
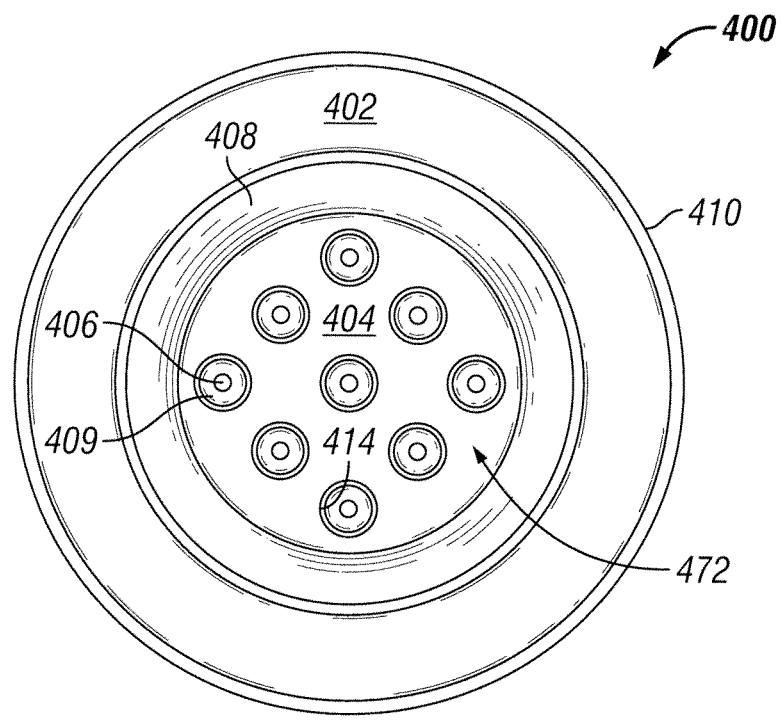
FIGS. 4A-C show various views of another exemplary damming device in accordance with certain exemplary embodiments.
Figure 4B:
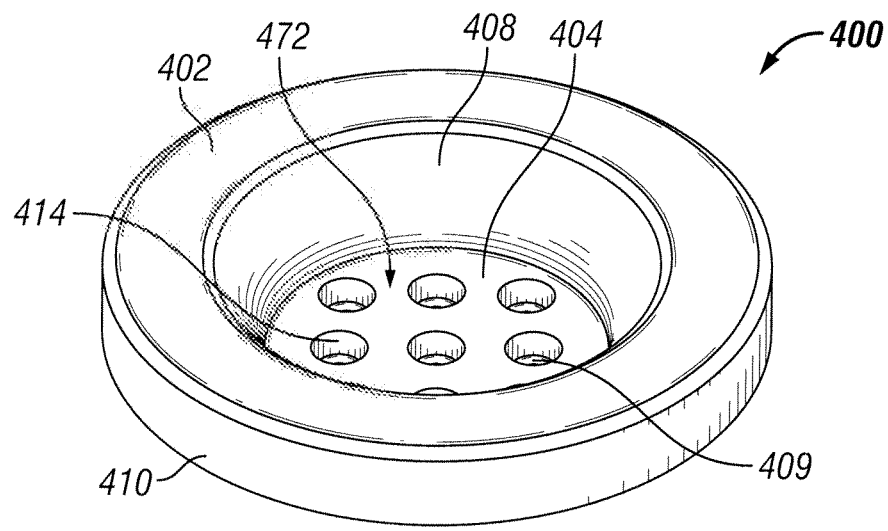
Figure 4C:
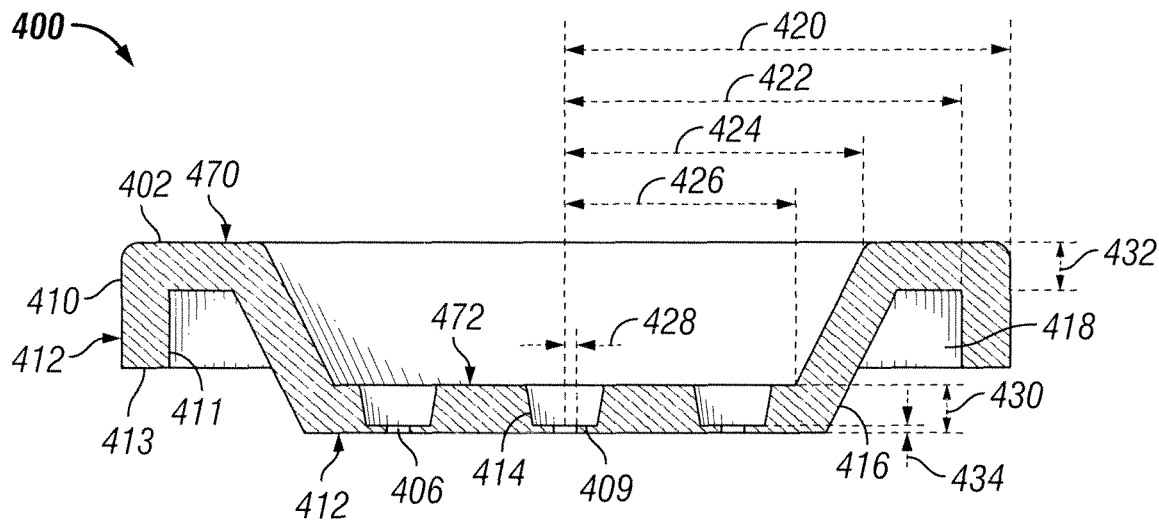

FIGS. 4A-C show various views of another exemplary damming device 400 in accordance with certain exemplary embodiments. The damming device 400 is similar to the damming device 100 of FIGS. 1A-D and the damming device 200 of FIG. 2, with a few modified and added features. For example, rather than the side wall 408 joining the outer portion 470 and the inner portion 472 being vertical (i.e., substantially perpendicular to the top surface 402 of the outer portion 470 and the top surface 404 of the inner portion 472), the side wall 408 is tapered inward. In other words, the side wall 408 forms a conical shape, as the outer radius 426 of the inner portion 472 is less than the inner radius 424 of the outer portion 470.

With respect to the damming device 200 of FIG. 2, the recessed portions 474 of the damming device 400 also have tapered side walls 414, creating a conical shape where the inner radius 427 of the bottom end of the recessed portion 474 is less than the outer radius 429 of the top end of the recessed portion 474. The bottom end of the recessed portion 474 has a thickness 434 between the surface 409 at the bottom end of the recessed portion 474 and the bottom surface 412 of the damming device 400.

The surface 409 at the bottom end of each recessed portion 474 is shown in FIGS. 4A-C to have a hole 406. One or more of the holes 406 can be fabricated during the manufacturing process of the damming device 400. Alternatively, one or more of the holes 406 can be made by puncturing the thickness 434 between the surface 409 at the bottom end of the recessed portion 474 and the bottom surface 412 of the damming device 400 with an object. Examples of such an object can include, but are not limited to, a conductor, a nail, and a pin.

An added feature of the damming device 400 relative to damming device 100 and damming device 200 is a vertically extending portion 476 that extends downward from the outer end of the outer portion 470. The vertically extending portion 476 has a width 421 (thickness) defined between the outer radius 420 of the damming device 400 (which coincides with the outer wall 410 of the vertically extending portion 476) and the inner radius 422 of the vertically extending portion 476 (which coincides with the inner wall 411 of the vertically extending portion 476). The width 421 of the vertically extending portion 476 can be substantially similar to the thickness 432 of the outer portion 470.

In addition, the vertically extending portion 476 has a height 433 that is less than the height 435 of the entire damming device 400, but greater than the thickness 434 of the recessed portion 474, the thickness 430 of the inner portion 472, and the thickness 432 of the outer portion 470. In certain exemplary embodiments, the vertically extending portion 476 is part of the outer portion 470, forming a single piece. Alternatively, the vertically extending portion 476 is a separate piece that is mechanically coupled to the outer portion 470.

Figure 5:
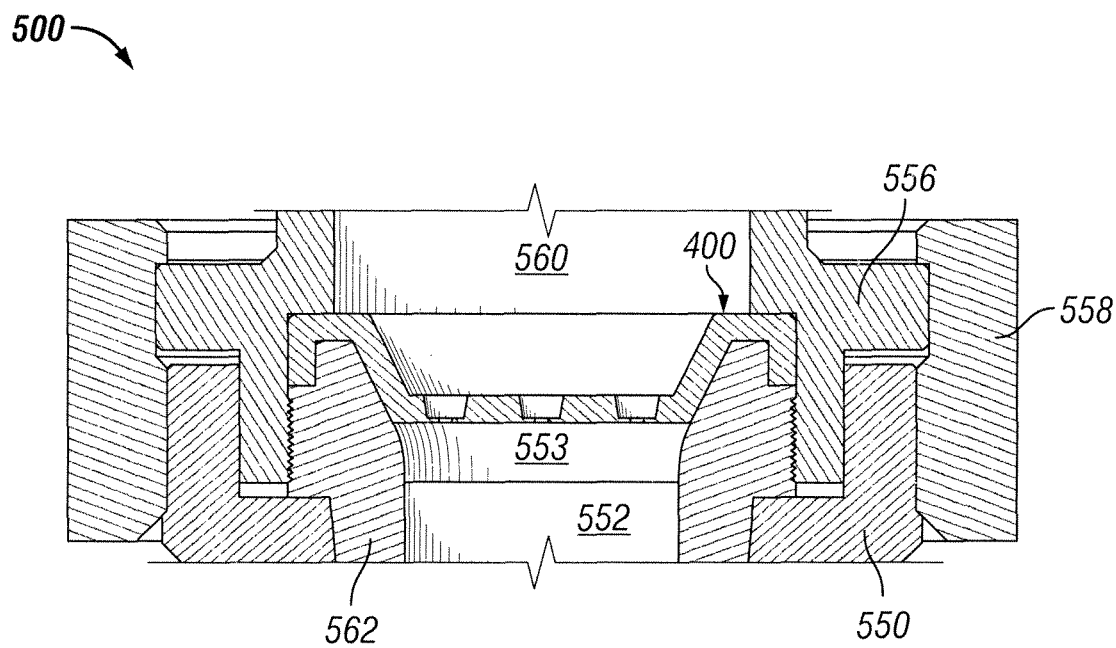
FIG. 5 shows a cross-sectional side view of another cable gland assembly using the exemplary damming device of FIGS. 4A-C in accordance with certain exemplary embodiments.

In certain exemplary embodiments, the existence of the vertically extending portion 476 (including the width 421 and height 433 of the vertically extending portion 476), the degree to which the side wall 408 connecting the outer portion 470 to the inner portion 472 is tapered, and/or the thickness between the side wall 408 and the side wall 416 are based on the shape and size of the gap formed by the components of the cable gland connector 500 when such components are assembled. FIG. 5 shows a cross-sectional side view of a cable gland assembly 500 using the exemplary damming device 400 of FIGS. 4A-C in accordance with certain exemplary embodiments. Referring to FIGS. 4A-5, the upper portion of the compound chamber 562 is shaped in a way that is complementary to the shape of the underside of the damming device 400. Likewise, the bottom portion of the union body 556 is shaped in a way that is complementary to the shape of the side and top of the damming device 400. Otherwise, the cable gland assembly 500 of FIG. 5 is substantially similar to the cable gland assembly 300 of FIG. 3 described above.

Figure 6A:
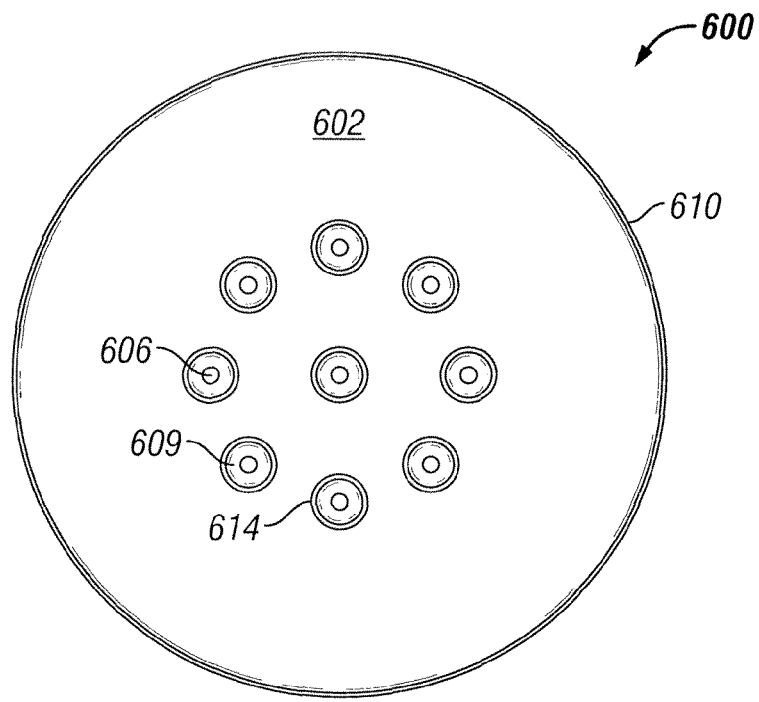
FIGS. 6A and 6B show various views of another exemplary damming device in accordance with certain exemplary embodiments.
Figure 6B:
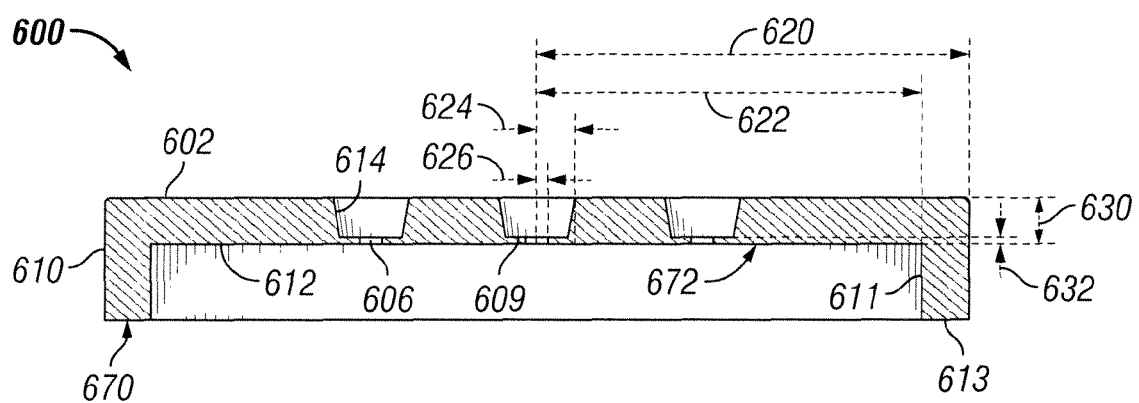

FIGS. 6A and 6B show various views of another exemplary damming device 600 in accordance with certain exemplary embodiments. The damming device 600 is similar to the damming device 100 of FIGS. 1A-D and the damming device 200 of FIG. 2, with a few modified and added features. For example, rather than the outer portion 670 extending above the inner portion 672, the outer portion 670 extends below the inner portion 672. As with the damming device 400 of FIGS. 4A-C, the recessed portions 674 of FIGS. 6A and 6B have tapered side walls 614, creating a conical shape where the inner radius 627 of the bottom end of the recessed portion 674 is less than the outer radius 629 of the top end of the recessed portion 674. The bottom end of the recessed portion 674 has a thickness 634 between the surface 609 at the bottom end of the recessed portion 674 and the bottom surface 612 of the inner portion 672.

Figure 7:
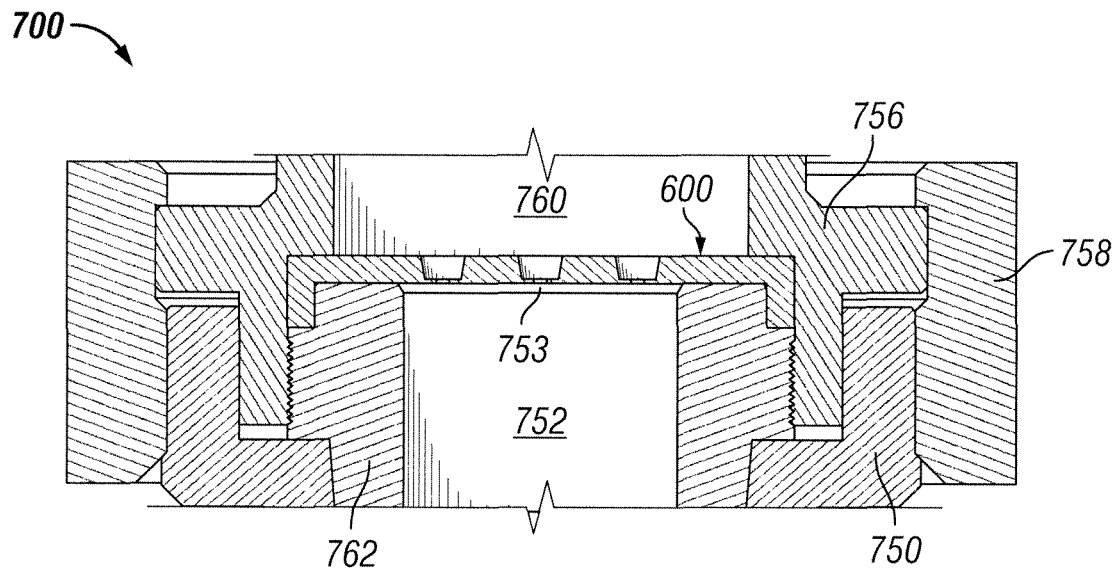
FIG. 7 shows a cross-sectional side view of yet another cable gland assembly using the exemplary damming device of FIGS. 6A and 6B in accordance with certain exemplary embodiments.

In certain exemplary embodiments, the downward extension of the outer portion 470, the degree to which the inner side wall 611 of the outer portion 670 is angled (in this case, perpendicular) relative to the inner portion 672, and/or the thickness 621 of the outer portion 670 are based on the shape and size of the gap formed by the components of the cable gland connector 700 when such components are assembled. FIG. 7 shows a cross-sectional side view of a cable gland assembly 700 using the exemplary damming device 600 of FIGS. 6A and 6B in accordance with certain exemplary embodiments. Referring to FIGS. 6A-7, the upper portion of the compound chamber 762 is shaped in a way that is complementary to the shape of the underside of the damming device 600. Likewise, the bottom portion of the union body 756 is shaped in a way that is complementary to the shape of the side and top of the damming device 600. Otherwise, the cable gland assembly 700 of FIG. 7 is substantially similar to the cable gland assembly 300 of FIG. 3 described above.

Figure 8A:
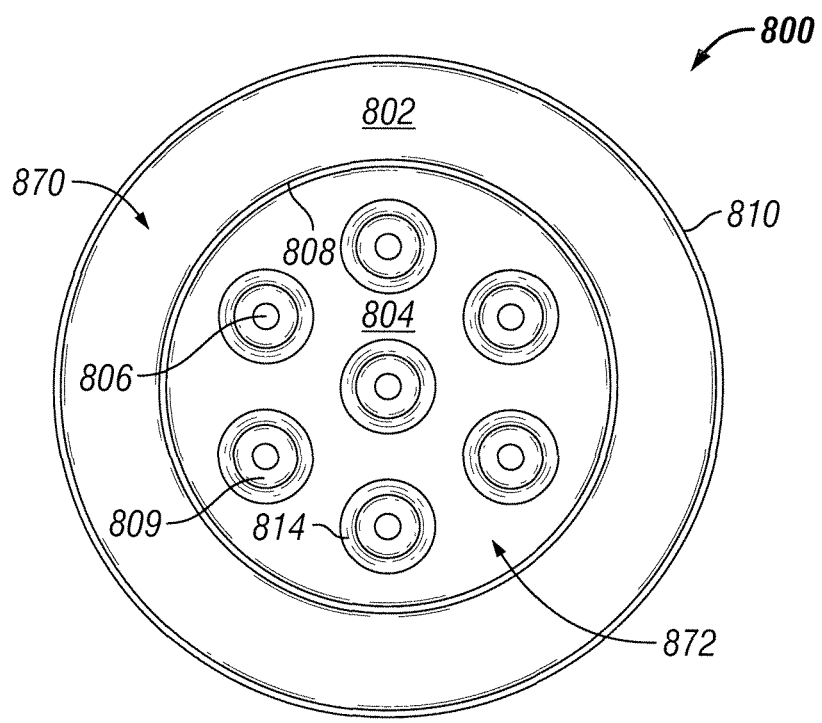
FIGS. 8A and 8B show various views of still another exemplary damming device in accordance with certain exemplary embodiments.
Figure 8B:
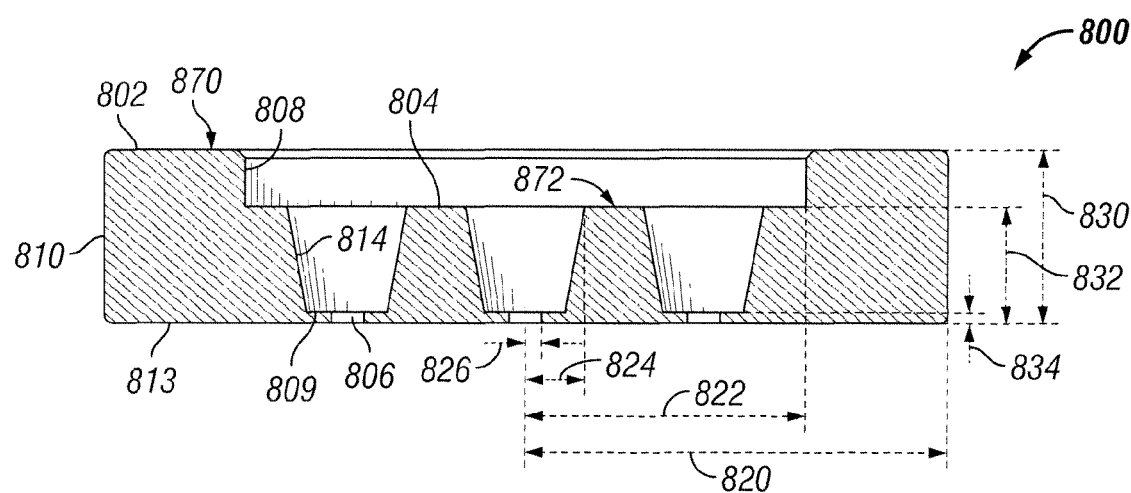

FIGS. 8A and 8B show various views of another exemplary damming device 800 in accordance with certain exemplary embodiments. The damming device 800 is similar to the damming device 100 of FIGS. 1A-D and the damming device 200 of FIG. 2, with a few modified and added features. For example, as with the damming device 400 of FIGS. 4A-C, the recessed portions 874 of FIGS. 8A and 8B have tapered side walls 814, creating a conical shape where the inner radius 827 of the bottom end of the recessed portion 874 is less than the outer radius 829 of the top end of the recessed portion 874. The bottom end of the recessed portion 874 has a thickness 834 between the surface 809 at the bottom end of the recessed portion 874 and the bottom surface 812 of the damming device 800.

Figure 9:
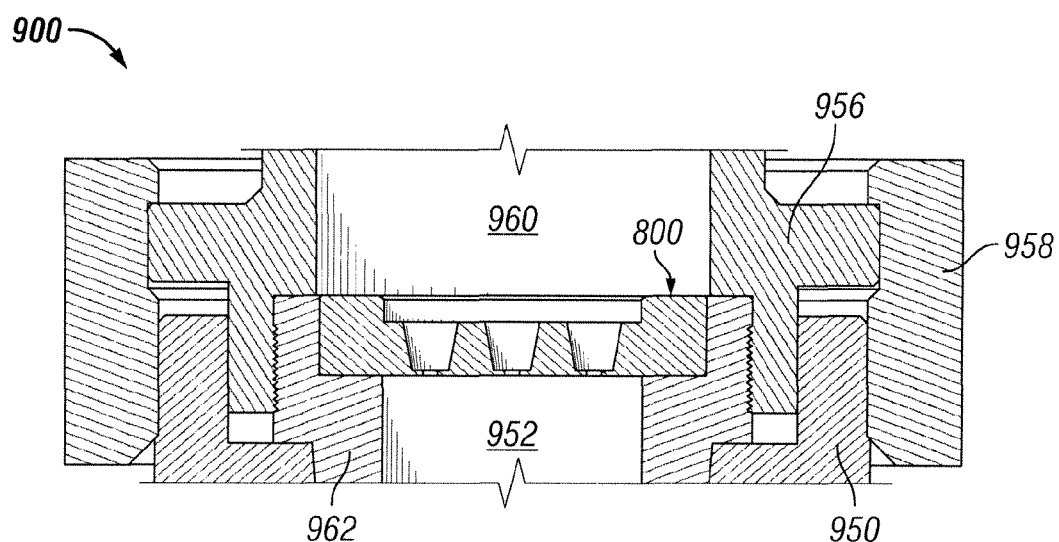
FIG. 9 shows a cross-sectional side view of still another cable gland assembly using the exemplary damming device of FIGS. 8A and 8B in accordance with certain exemplary embodiments.

In certain exemplary embodiments, the width 821 of the outer portion 870, the degree to which the outer side wall 810 of the outer portion 870 is angled (in this case, perpendicular) relative to the inner portion 872, and/or the thickness 830 of the outer portion 870 are based on the shape and size of the gap formed by the components of the cable gland connector 900 when such components are assembled. FIG. 9 shows a cross-sectional side view of a cable gland assembly 900 using the exemplary damming device 800 of FIGS. 8A and 8B in accordance with certain exemplary embodiments. Referring to FIGS. 8A-9, the upper portion of the compound chamber 962 is shaped in a way that is complementary to the shape of the underside of the damming device 800. Likewise, the bottom portion of the union body 956 is shaped in a way that is complementary to the shape of the side and top of the damming device 800. Otherwise, the cable gland assembly 900 of FIG. 9 is substantially similar to the cable gland assembly 300 of FIG. 3 described above.

Figure 10A:
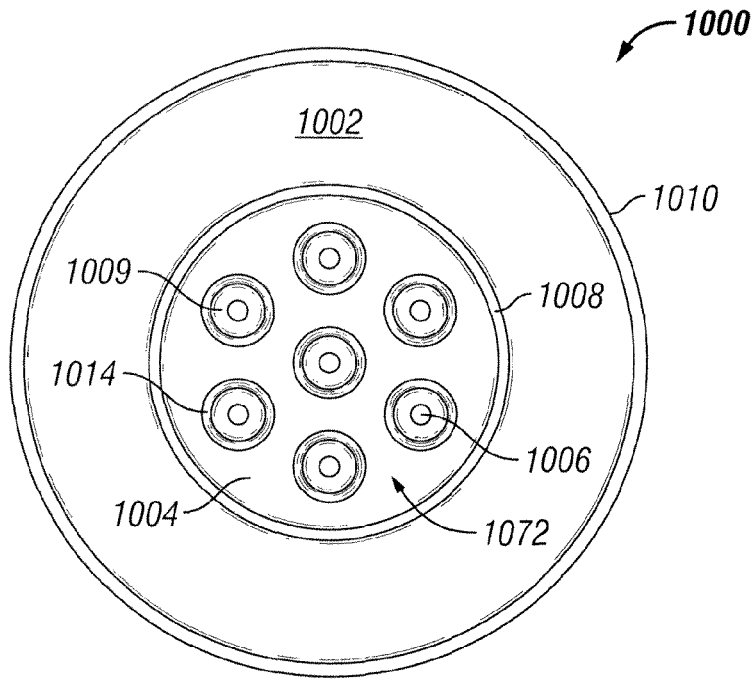
FIGS. 10A and 10B show various views of yet another exemplary damming device in accordance with certain exemplary embodiments.
Figure 10B:
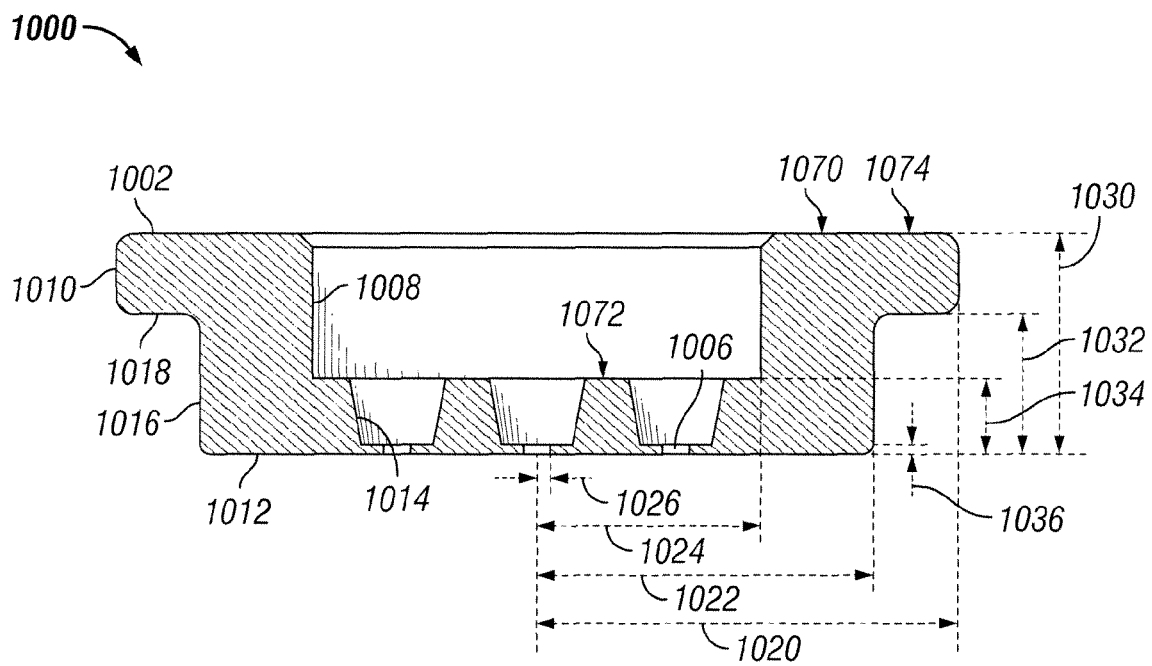

FIGS. 10A and 10B show various views of another exemplary damming device 1000 in accordance with certain exemplary embodiments. The damming device 1000 is similar to the damming device 100 of FIGS. 1A-D and the damming device 200 of FIG. 2, with a few modified and added features. For example, rather than the outer portion 1070 extending above the inner portion 1072, the outer portion 1070 extends away from the inner portion 1072. The outwardly extending portion 1076 has a width 1023 defined between the outer radius 1020 of the damming device 1000 (which coincides with the outer wall 1010 of the outwardly extending portion 1076) and the inner radius 1022 of the outwardly extending portion 1076 (which coincides with the outer wall 1016 of the outer portion 470).

As with the damming device 400 of FIGS. 4A-C, the recessed portions 1074 of FIGS. 10A and 10B have tapered side walls 1014, creating a conical shape where the inner radius 1027 of the bottom end of the recessed portion 1074 is less than the outer radius 1029 of the top end of the recessed portion 1074. The bottom end of the recessed portion 1074 has a thickness 1034 between the surface 1009 at the bottom end of the recessed portion 1074 and the bottom surface 1012 of the inner portion 1072.

In addition, the outwardly extending portion 1076 has a thickness 1031 (height) that is less than the thickness 1030 of the outer portion 1070, but greater than the thickness 1036 of the recessed portion 1074 and the thickness 1034 of the inner portion 1072. In certain exemplary embodiments, the outwardly extending portion 1076 is part of the outer portion 1070, forming a single piece. Alternatively, the outwardly extending portion 1076 is a separate piece that is mechanically coupled to the outer portion 1070.

Figure 11:
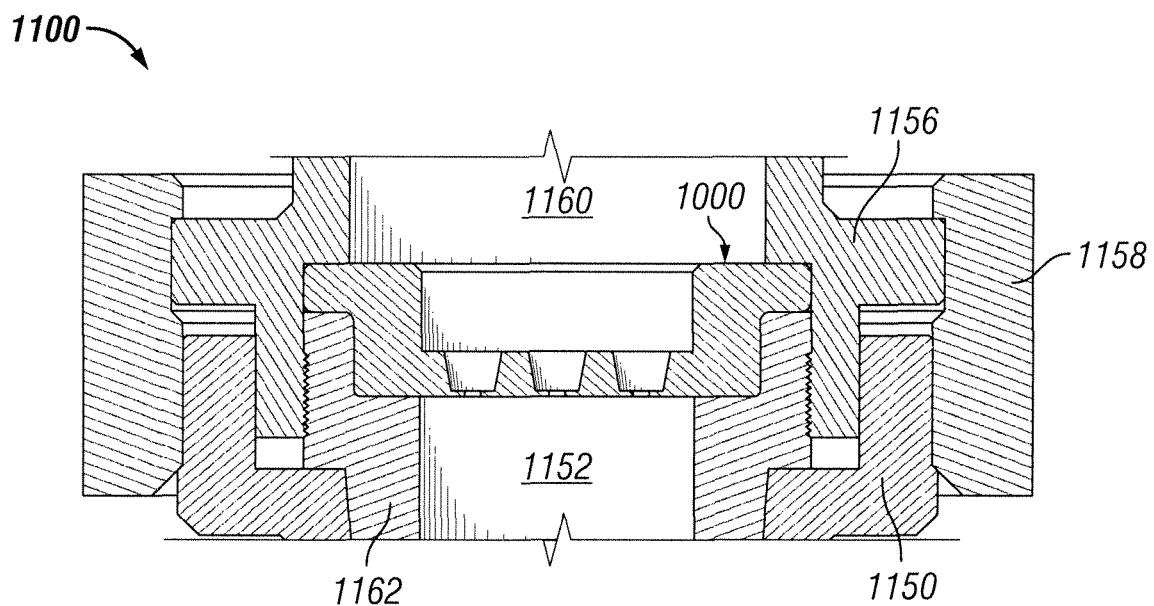
FIG. 11 shows a cross-sectional side view of still another cable gland assembly using the exemplary damming device of FIGS. 10A and 10B in accordance with certain exemplary embodiments.

In certain exemplary embodiments, the existence of the outwardly extending portion 1076 (including the width 1023 and thickness 1031 of the outwardly extending portion 1076), the degree to which the outer side wall 1016 of the outer portion 1070 is angled (in this case, perpendicular) relative to the outwardly extending portion 1076, and/or the thickness between the side wall 1008 and the side wall 1016 are based on the shape and size of the gap formed by the components of the cable gland connector 1100 when such components are assembled. FIG. 11 shows a cross-sectional side view of a cable gland assembly 1100 using the exemplary damming device 1000 of FIGS. 10A and 10B in accordance with certain exemplary embodiments. Referring to FIGS. 10A-11, the upper portion of the compound chamber 1162 is shaped in a way that is complementary to the shape of the underside of the damming device 1000. Likewise, the bottom portion of the union body 1156 is shaped in a way that is complementary to the shape of the side and top of the damming device 1000. Otherwise, the cable gland assembly 1100 of FIG. 11 is substantially similar to the cable gland assembly 300 of FIG. 3 described above.

Exemplary embodiments described herein provide for a damming device for cable sealing. Specifically, exemplary embodiments are directed to a damming device that is inserted into a gap formed within a cable gland connector. In such an assembly, the exemplary damming device fits within the gap under tension, as opposed to under compression. The exemplary damming device has a thicker perimeter (outer portion). In addition, certain exemplary damming devices have a curved collar (e.g., a tapered section joining the inner portion and the outer portion). Also, exemplary damming devices described herein have a thinner section (less thickness in the inner portion and/or the recessed portion) to make the damming device easily flexible and conforming around the cable.

One or more of these characteristics of the exemplary damming device creates a liquid-tight seal around the annulus of the one or more conductors that pass through the damming device while the damming device is positioned within the gap formed by one or more components of the cable gland connector. In such a case, portions of the damming device surrounding the hole through which the conductor traverses can be under tension with respect to the conductor. As a result, little to no sealing compound, injected into the compound chamber of the cable gland connector to seal the conductor, leaks into the union body of the cable gland connector.

Although the embodiments herein are described with reference to preferred and/or exemplary embodiments, it should be appreciated by those skilled in the art that various modifications are well within the scope and spirit of this disclosure. From the foregoing, it will be appreciated that embodiments herein overcome the limitations of the prior art. Those skilled in the art will appreciate that the exemplary embodiments are not limited to any specifically discussed application and that the embodiments described herein are illustrative and not restrictive. From the description of the exemplary embodiments, equivalents of the elements shown therein will suggest themselves to those skilled in the art, and ways of constructing other embodiments will suggest themselves to practitioners of the art. Therefore, the scope of the exemplary embodiments is not limited herein.

What is claimed is:

1. A cable gland connector, comprising:
    a union body;
    a hub body removably coupled to the union body;
    a compound chamber positioned within the hub body and mechanically coupled to the union body; and
    a damming device disposed within a gap formed between a top portion of the compound chamber and a bottom portion of the union body, wherein the damming device comprises:
        an outer portion having a first diameter, a second diameter, and a first thickness of a flexible elastomeric material, wherein the first thickness is disposed between the first diameter and the second diameter;
        a first hole having a third diameter; and
        an inner portion having a second thickness of the flexible elastomeric material disposed between the third diameter and the second diameter,
        wherein the first diameter is greater than the second diameter,
        wherein the second diameter is greater than the third diameter,
        wherein the first hole traverses at least a portion of the second thickness of the inner portion, and
        wherein the first thickness is greater than the second thickness.

2. The cable gland connector of claim 1, further comprising:
    a union body nut threadably coupled to the union body and the hub body.

3. The cable gland connector of claim 1, further comprising:
    a conductor that slidably couples to the first hole in the damming device, wherein the inner portion of the damming device creates a liquid-tight seal around an annulus of the conductor.

4. The cable gland connector of claim 3, further comprising:
    a sealing compound injected into the compound chamber between the conductor and the hub body,
    wherein the damming device prevents the sealing compound in the compound chamber from entering the union body.

5. The cable gland connector of claim 3, wherein the first hole is formed by penetrating the conductor through the second thickness of the inner portion.

6. The cable gland connector of claim 3, wherein the first hole expands when receiving the conductor to form the liquid-tight seal, wherein the first hole is under tension when the conductor is received in the first hole.

7. The cable gland connector of claim 1, wherein the first hole is among a plurality of holes that traverse the inner portion.

8. The cable gland connector of claim 7, wherein the inner portion comprises a plurality of recessed portions, wherein the plurality of recessed portions has a third thickness of the flexible elastomeric material disposed between a fourth diameter and a fifth diameter, wherein the plurality of holes has the fifth diameter, and wherein the third thickness is less than the second thickness.

9. The cable gland connector of claim 8, wherein the fourth diameter is less than a sixth diameter of the plurality of recessed portions, wherein the sixth diameter is disposed on a top surface of the inner portion, wherein the plurality of recessed portions form concentric circles with the plurality of holes and with a plurality of circles formed by the fourth diameter.

10. The cable gland connector of claim 7, wherein a remainder of the plurality of holes is symmetrically positioned around the first hole.

11. The cable gland connector of claim 10, wherein the inner portion comprises a plurality of recessed portions adjacent to the remainder of the plurality of holes, wherein the plurality of recessed portions has a fourth thickness of the flexible elastomeric material disposed between a seventh diameter and an eighth diameter, wherein the remainder of the plurality of holes has the eighth diameter, and wherein the fourth thickness is less than the second thickness.

12. The cable gland connector of claim 1, wherein the outer portion is held in place within the gap without a compressive force being applied thereto.

13. The cable gland connector of claim 1, wherein the first hole has a conical shape having the third diameter at a top end of the first hole and a ninth diameter at a bottom end of the first hole.

14. The cable gland connector of claim 13, wherein the bottom end of the first hole is planar to a bottom side of the inner portion and a bottom side of the outer portion.

15. The cable gland connector of claim 1, further comprising:
    an extending portion having a fifth thickness of the flexible elastomeric material disposed between the first diameter of the first thickness and a tenth diameter,
    wherein the tenth diameter is greater than the first diameter of the first thickness, and
    wherein the first thickness is greater than the fifth thickness.

16. The cable gland connector of claim 15, wherein the first thickness is substantially the same as the fifth thickness.

17. The cable gland connector of claim 1, further comprising:
    an extending portion having a sixth thickness of the flexible elastomeric material disposed between the first diameter and an eleventh diameter,
    wherein the eleventh diameter is greater than the first diameter, and
    wherein the sixth thickness is greater than the second thickness and less than the first thickness.

18. A cable gland connector, comprising:
    a union body;
    a hub body removably coupled to the union body;
    a compound chamber positioned within the hub body and mechanically coupled to the union body; and
    a damming device disposed within a gap formed between a top portion of the compound chamber and a bottom portion of the union body, the damming device comprising:

an outer portion having a first diameter, a second diameter, and a first thickness of a flexible elastomeric material, wherein the first thickness is disposed between the first diameter and the second diameter;

a hole having a fourth diameter;

an inner portion having a third diameter, the fourth diameter, and a second thickness of the flexible elastomeric material, wherein the second thickness is disposed between a third diameter and the fourth diameter; and a tapered portion positioned between and adjacent to the inner portion and the outer portion, wherein the intermediate portion has the second diameter, the third diameter, and a tapered surface, wherein the intermediate portion comprises the flexible elastomeric material, wherein the first diameter is greater than the second diameter, wherein the second diameter is greater than the third diameter, wherein the third diameter is greater than the fourth diameter, and wherein the first thickness is greater than the second thickness.

19. The cable gland connector of claim 18, further comprising:

a conductor disposed within the hole, wherein the inner portion of the damming device creates a liquid-tight seal around an annulus of the conductor.

20. The cable gland connector of claim 19, further comprising:

a sealing compound injected into the compound chamber between the conductor and the hub body, wherein the damming device prevents the sealing compound in the compound chamber from entering the union body.

* * * * *